W. A. BONNELL.
JOINT OR COUPLING FOR ELECTRICAL CONDUITS.
APPLICATION FILED APR. 10, 1916.
1,313,456.
Patented Aug. 19, 1919.
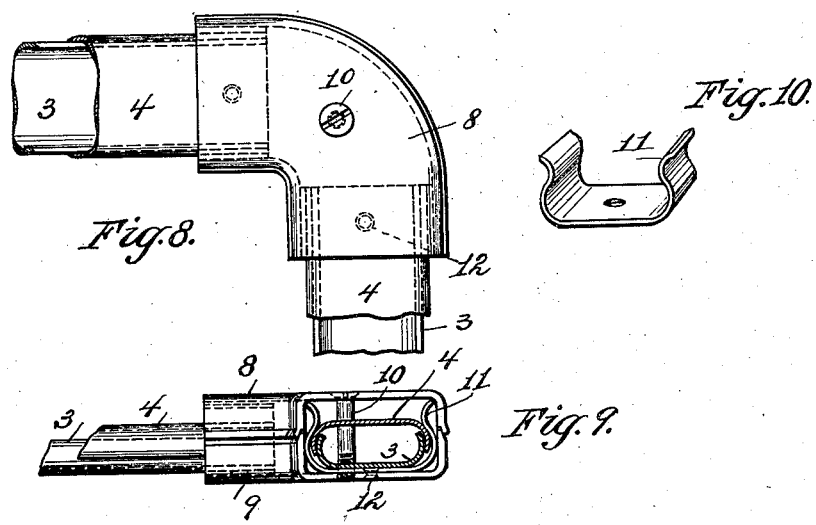
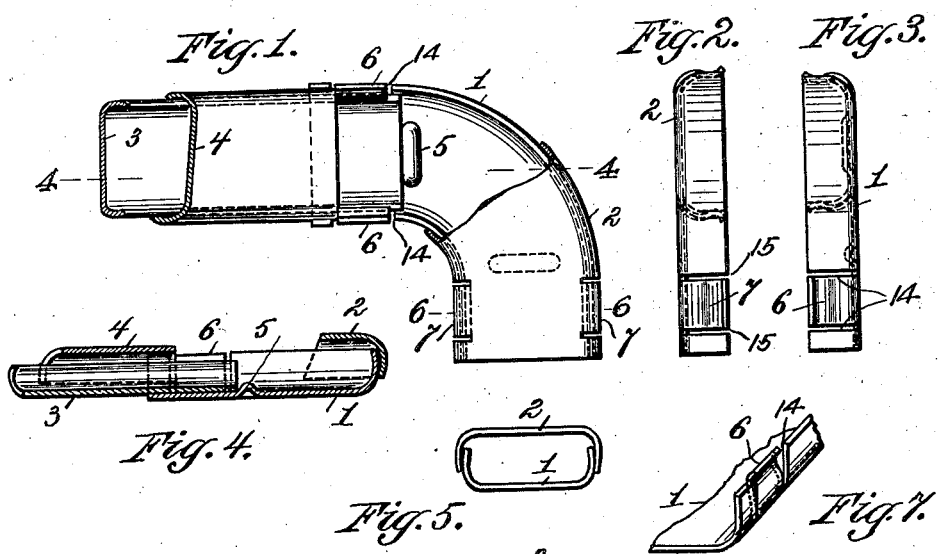
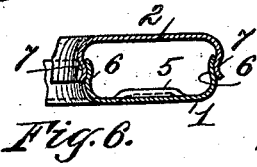
WITNESSES:
INVENTOR
William A. Bonnell
BY
Fredk C. Fischer
ATTORNEY

UNITED STATES PATENT OFFICE.

WILLIAM A. BONNELL, OF BROOKLYN, NEW YORK.

JOINT OR COUPLING FOR ELECTRICAL CONDUITS.

1,313,456.  Specification of Letters Patent.  Patented Aug. 19, 1919.

Application filed April 10, 1916. Serial No. 90,069.

*To all whom it may concern:*

Be it known that I, WILLIAM A. BONNELL, a citizen of the United States, residing in the borough of Brooklyn, in the county of Kings and State of New York, have invented certain new and useful Improvements in Joints or Couplings for Electrical Conduits, of which the following is a full, clear, and exact description, such as will enable others skilled in the art to which it pertains to make, construct, and use the same, reference being had to the accompanying drawings, and to numerals of reference marked thereon, forming a part of this specification.

My invention relates to joints or couplings used with electrical conduits known as metal moldings, and for joining sections of such moldings to junction boxes and other fittings.

The object of this invention is to provide an improved joint or coupling for electrical conduit sections, which may be efficiently and readily caused to perform its coupling functions by mere insertion of the metal moldings into the joint or coupling, thereby obtaining neat and workmanlike joints, which may be readily secured together at the point of installation, and which will afford the desired electrical continuity.

I prefer to make such couplings or joints which comprise an inner or base section and a removable cover section, each from a single piece of sheet metal stamping.

With these and other objects in view, the invention consists in the construction and arrangements of parts illustrated in the accompanying drawings, in which Figure 1 represents a plan view of an elbow connection, with the cover section thereof partly broken away.

Figs. 2 and 3 represent respectively, side elevations of the cover section and base section.

Fig. 4 represents a sectional side elevation taken on lines 4—4 of Fig. 1.

Fig. 5 represents a partial end elevation of the elbow.

Fig. 6 represents a transverse section taken on lines 6—6 of Fig. 1.

Fig. 7 represents a fragmentary view of the base section, illustrating one of the spring tongues cut out and formed integral with the base section.

Figs. 8 and 9 represent respectively, a plan view and a side elevation of a modified form of my invention; and Fig. 10 represents a perspective view of the spring conduit clamp employed in the modified form.

Similar numerals of reference refer to like parts throughout the specification and drawings.

In the embodiment of my invention shown in the drawings, the joint or coupling is composed of two separable sections, namely, a base section 1 adapted to be secured to a supporting surface, such as a wall or ceiling, and a removable cover section 2. These parts are preferably made from a single piece of sheet metal, and are of such shape as to lend themselves readily to manufacture by the use of suitable punches and dies.

In Fig. 1 of the drawings is shown a plan view of an elbow connection, the cover section of the elbow member, which is adapted to be snapped upon the base section, removed, one end of said elbow section having frictionally secured thereto, in a manner to be hereinafter described, and in order to obtain the desired electrical continuity, the metal molding, which as herein shown, for purposes of illustration, is of general elliptical form, made up of an inner section 3 and a cover section 4, formed from strips of steel, so that the cover section may be snapped upon and clamped to the side walls of the inner section 3.

The base section 1 is provided with inwardly-projecting integral stops or beads 5, preferably formed by forcing the metal of said base section inwardly simultaneously with the forming of said section, to provide means against which the inner edge of the inner section 3 of the metal molding abuts to limit the inward movement of the same.

The inner edge of the cover section 4 of the metal molding, preferably abuts against the outer edge of the spring tongues 6—6 of the base 1, to limit the inward movement thereof.

In order to provide means for readily inserting and frictionally holding the inner section 3 of the metal molding in contact with the bottom and walls of the base section 1, thus insuring a perfect ground between said base section 1 and the conduit, thereby preventing electrical arcs from heating or otherwise injuring the coupling or joint, I provide adjacent to the open ends of said base section a pair of spring tongues 6, cut out and formed integral with the base section 1 simultaneously with the blanking out and forming of said base section 1, the spring tongues being of a shape corresponding with the shape of the sides of the inner section 3 of the metal molding, in order to frictionally and securely hold the under and outer sides of the inner section 3 in frictional contact with the inside of the base section 1, thus insuring a perfect ground between the conduit and coupling. When the spring tongues 6—6 and 7—7 are cut out during the forming of the base sections 1 and 2, elongated slots 14—14 and 15—15 are formed in each wall of the base sections 1 and 2, giving to the tongues the required spring to enable them to be readily formed into the shape illustrated in the drawings.

The cover section 2 is similarly provided with corresponding spring tongues 7, adapted to have locking engagement with the spring tongues 6 formed in the base section 1, when said cover section 2 is snapped upon said base section 1.

By forming these spring tongues 6 in the side walls of the base section 1, in close proximity to the open ends thereof, and giving them a shape approximating the shape of the side walls of the inner section 3 of the metal molding, means are provided which may be efficiently and readily caused to perform their coupling functions by mere insertion of the metal moldings into the joint or coupling, thereby obtaining neat and workmanlike joints, which may be readily secured together at the point of installation, and which will afford the desired electrical continuity. By providing the cover section with similar spring tongues 7, adapted to have locking engagement with the spring tongues 6 formed in the base section, means are provided for the ready removal of said cover from the base section, and simultaneously, ready means for snapping said cover into locking engagement with the base section are provided. From an inspection of Figs. 1 and 7 of the drawings, it will be seen that the spring tongues 6—6 of the base section 1 are so formed as to project inwardly from the side walls of said section, to provide integral spring means into which the inner or lower section 3 of the metal molding is forced and frictionally secured.

From an inspection of Fig. 1 of the drawings, it will further be noted that the inward movement of the inner edge of the cover section 4 of the metal molding is limited by the outer edges of the spring tongues 6—6 of the base section 1 against which edges the said inner edge of the cover section 4 abuts.

Owing to the construction of the spring tongues 6, a perfect ground between the base section and the conduit is insured, as distinguished from couplings made from cast metal, into the end of which the metal molding has hitherto been secured by means of a screw, the metal molding in many cases becoming accidentally separated from the coupling caused by the expansion of the metal.

Although I prefer to make the base section and the removable cover section each from a piece of sheet metal stamping, I have shown in Figs. 8 and 9 of the drawings, a cast-iron coupling or joint, comprising an upper section 8 and a lower section 9, secured together by means of a screw-bolt 10 or the like, the openings being provided with spring clamps 11 removably secured thereto in any convenient or desired manner, as by means of a rivet 12 or the like, said clamps 11, in their preferred form, being made from a single piece of spring material, and of a shape corresponding to the shape of the metal molding, in order to frictionally hold the metal molding between the side walls of said spring clamps 11.

It will thus be seen that I have provided a joint or coupling for electrical conduits in which I have reduced the actual number of parts to two, namely, a base section and a cover section, the base section being provided with integral means for efficiently and readily securing a metal molding thereto by mere insertion and by providing the cover section with similar spring means adapted to have locking engagement with spring means formed in the base section, for the ready removal of said cover from the base section and for simultaneously snapping said cover into locking engagement with the base section.

Experience has demonstrated that the organization above described is a practical and efficient one for accomplishing the ends sought by this invention. The construction may, however, be varied in detail by those skilled in such matters without departing from the invention. I desire to claim the device as broadly as the state of the art will permit, and with no limitations other than such as they may be expressed in the claims as they may be allowed.

I claim:

1. A coupling for electrical conduits, comprising a base section and a cover section, each section made from a single piece of suitable material, and provided near its open ends with integral spring registering means, the spring means of the base section designed for securing an electrical conduit thereto, and the integral spring means of the cover section designed for securing said cover section into locking engagement with the base section, the base section being further provided with means in the bottom thereof for limiting the inward movement of the lower section of the conduit, the inward movement of the upper section of said conduit being limited by the integral spring means of the base section.

2. A coupling for electrical conduits, comprising a base section and a cover section, each section made from a single piece of suitable material, the base section near its open ends being provided with integral spring tongues formed in the side walls of the base section designed for frictionally securing the lower section of a metal molding, the cover section near its open ends being also provided with integral spring tongues formed in the side walls thereof for securing said cover section into locking engagement with the base section, the base section being further provided with integral stops in the bottom thereof against which the inner lower edge of the lower section of the metal molding abuts to limit the inward movement of the same, the inward movement of the inner edge of the upper section of the metal molding being limited by the outer edges of the spring tongues.

This specification signed and witnessed this 1st day of April, 1916.

WILLIAM A. BONNELL.

Witnesses:
 AURELIA MORGAN,
 GERTRUDE M. SCHNEIDER.